(12) United States Patent
Zambotti et al.

(10) Patent No.: US 6,510,227 B2
(45) Date of Patent: *Jan. 21, 2003

(54) SATELLITE TELEPHONE HANDSET

(75) Inventors: Lawrence G. Zambotti, Marshall, VA (US); Ronald A. Bowen, Sterling, VA (US); Dennis M. Kalajainen, Manassas, VA (US); Mark L. Kupeski, Strasburg, VA (US)

(73) Assignee: BAE Systems Information and Electronic Systems Integration, Inc., Nashua, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,429

(22) Filed: Aug. 27, 1999

(65) Prior Publication Data

US 2002/0054677 A1 May 9, 2002

Related U.S. Application Data

(63) Continuation-in-part of application No. 29/069,642, filed on Mar. 27, 1997, now Pat. No. Des. 414,486.

(51) Int. Cl.$^7$ .................................................. H04M 1/00
(52) U.S. Cl. ............................. 379/433.11; 379/433.13
(58) Field of Search .......................... 379/433.11, 433.12, 379/433.13; 455/575, 90

(56) References Cited

U.S. PATENT DOCUMENTS 5,668,867 A * 9/1997 Nagai ........................... 379/433
5,752,204 A * 5/1998 Epperson et al. ........... 455/575

* cited by examiner

*Primary Examiner*—Jack Chiang
(74) *Attorney, Agent, or Firm*—Swidler Berlin Shereff Friedman, LLP

(57) ABSTRACT

A telephone handset has a flat satellite antenna mounted thereon, the antenna being movable between a first position, in which the antenna is parallel to and contacting a main portion of the handset, and a second position, in which the satellite antenna faces in generally the same direction as a top surface of the main portion. A cover portion is mounted on a side of the main portion opposite to the satellite antenna and movable between an open position and a closed position to provide, with the satellite antenna, a compact three-fold configuration.

14 Claims, 10 Drawing Sheets

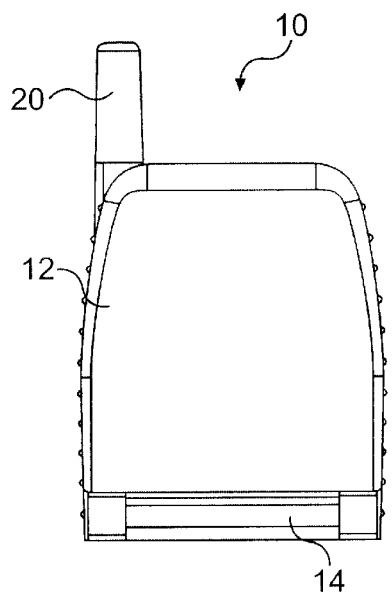
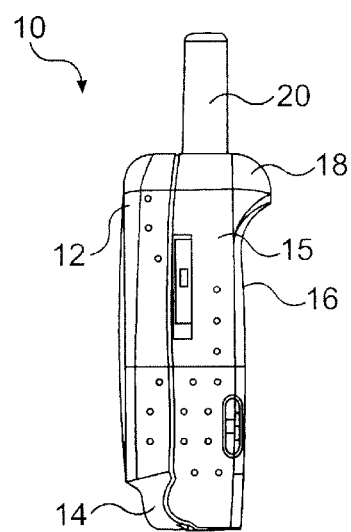
FIG. 5   FIG. 6
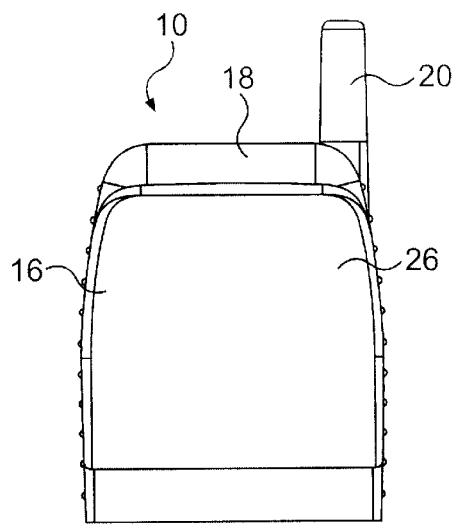
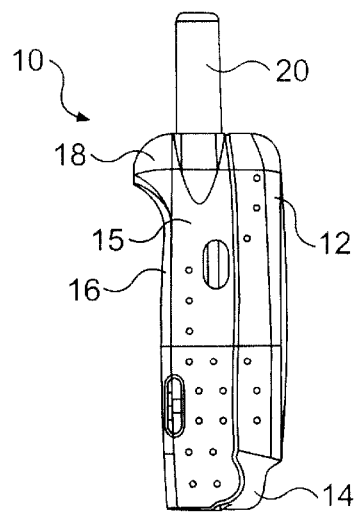
FIG. 7   FIG. 8

SATELLITE TELEPHONE HANDSET

CROSS-REFERENCE TO RELATED APPLICATION

This is a continuation-in-part of Ser. No. 29/069,642, U.S. Pat. No. D,414,486, filed on Mar. 27, 1997.

BACKGROUND OF THE INVENTION

The present invention relates to a telephone handset for use with a satellite. Telephone handsets for use in connection with satellites are known, but the antenna needed for communication with the satellite is a large helix, which makes the handset large and unwieldy overall.

SUMMARY OF THE INVENTION

By the present invention, a telephone handset for use in a satellite system has a flat satellite antenna mounted thereon. The satellite antenna is movable between a first position, in which the satellite antenna is parallel to and contacting a main portion of the handset, and a second position, in which the satellite antenna faces in generally the same direction as a top surface of the main portion, thereby providing a generally useful orientation of the satellite antenna when the handset is in use. The direction in which the satellite antenna faces in its second position differs from the direction in which the top surface of the main portion faces by less than 45°.

The telephone handset of the present invention includes a cover portion mounted on the main portion and movable between a closed position, in which the cover portion contacts a front of the main portion, and an open position, in which the cover portion defines an angle with the main portion. The cover portion has a keypad side having keys, the keypad side contacting the main portion in the closed position of the cover portion. The satellite antenna has a hinge connection at the top and back of the main portion, whereas the cover portion has a hinge connection at the front and bottom of the main portion. As a result, the cover portion, in its open position, extends forward from the handset, whereas the satellite antenna, in its open position, extends backward from the handset. In the first position of the satellite antenna and the closed position of the cover portion, the satellite telephone has a three-fold configuration, in which the cover portion, the main portion and the satellite antenna define three parallel contacting members hinged to one another in a compact arrangement.

BRIEF DESCRIPTION OF THE DRAWINGS

FIG. 5 is a front view in a closed position;

FIG. 6 is a right side view in a closed position;

FIG. 7 is a back view in a closed position;

FIG. 8 is a left side view in a closed position;

DETAILED DESCRIPTION OF THE PREFERRED EMBODIMENTS

Figure 1:
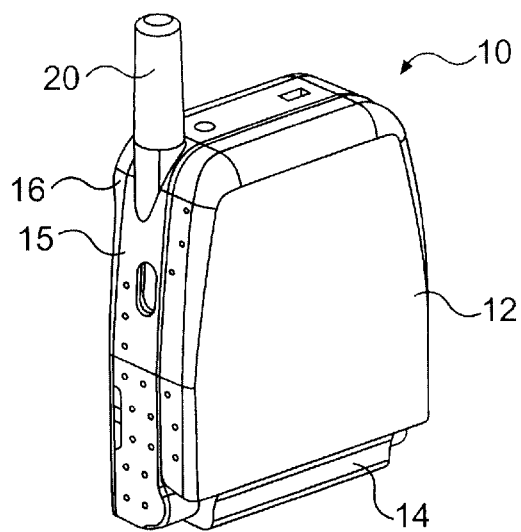
FIG. 1 is a perspective view from the front, top and left side of the satellite telephone handset showing our new design in a closed position.
Figure 2:
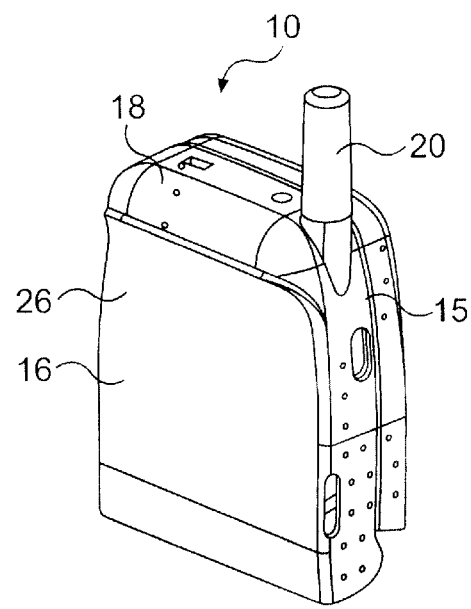
FIG. 2 is a perspective view from the back, top and left side of the handset in a closed position.
Figure 3:
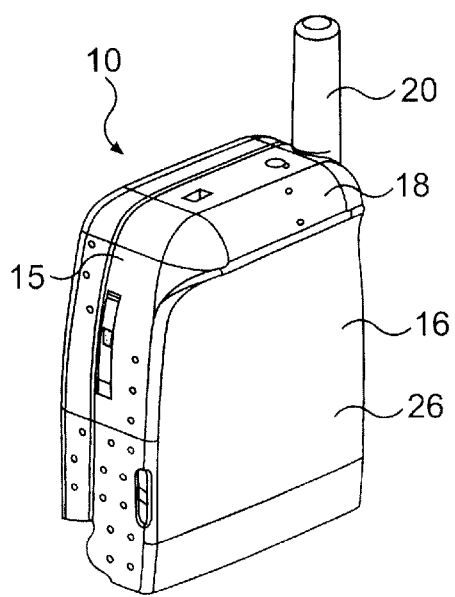
FIG. 3 is a back, top and right side perspective view in a closed position.
Figure 4:
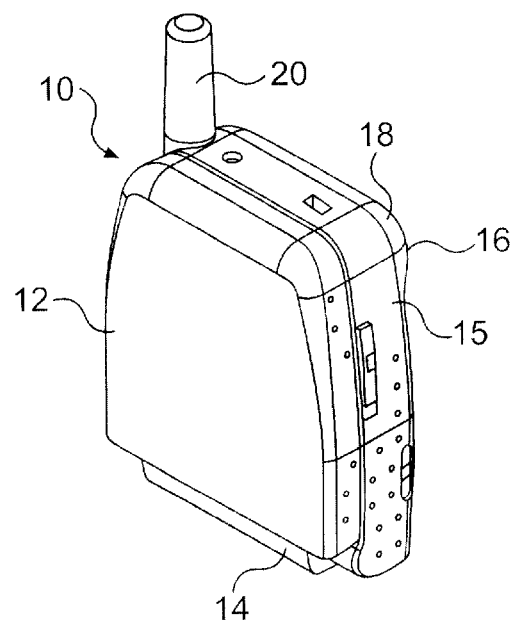
FIG. 4 is a front, top and right side perspective view in a closed position.

As can be seen from FIGS. 1–8, the satellite telephone handset according to the present invention, which is designated generally by the reference numeral 10, has a folded, closed condition which makes the handset convenient for carrying in a pocket or handbag. The handset 10 includes a cover portion 12 mounted by a hinge connection 14 at the front and bottom of a main portion 15, and a flat satellite antenna 16 mounted by a hinge connection 18 at the top and back of the main portion. The flat satellite antenna 16 is a patch antenna, which is defined as an antenna whose height is substantially smaller than its length and its width. The handset 10 can include a cellular antenna 20 extending upward from the main portion 15 where the handset has dual mode capability—satellite and cellular.

Figure 10:
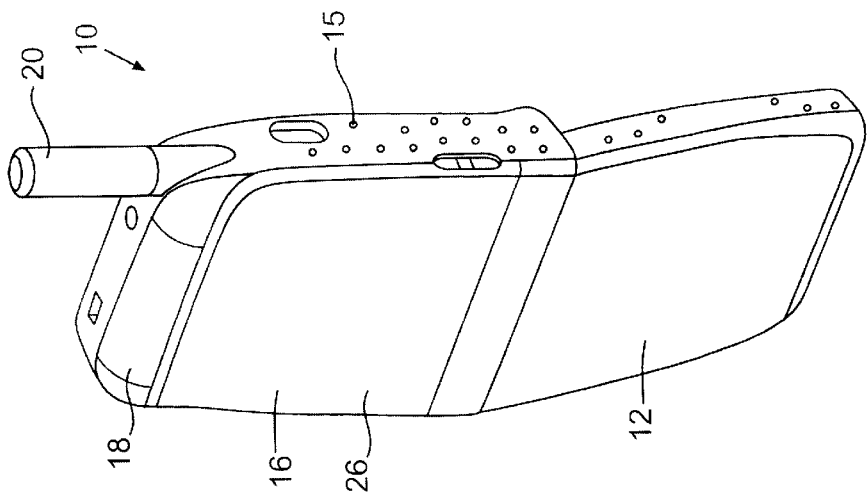
FIG. 10 is a back, top and left side perspective view of the handset in an open position.
Figure 9:
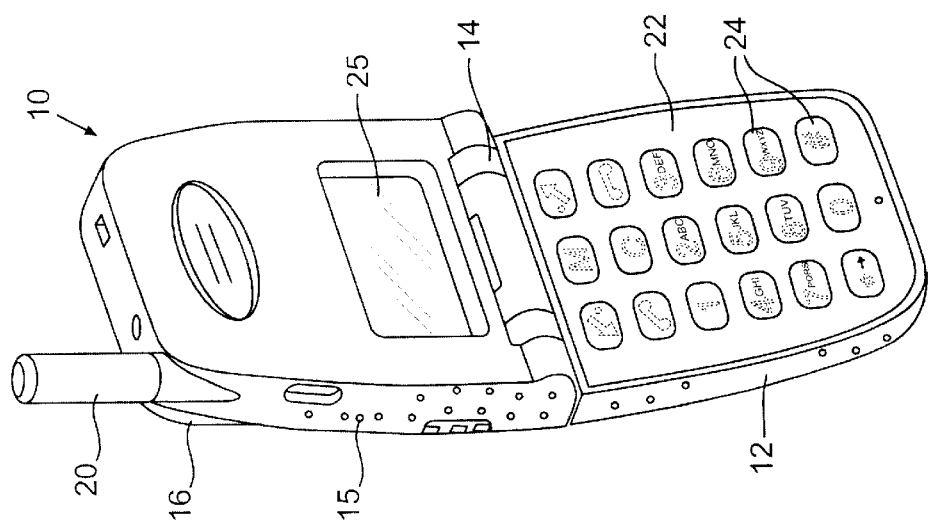
FIG. 9 is a front, top and left side perspective view of the satellite telephone handset in an open position.
Figure 12:
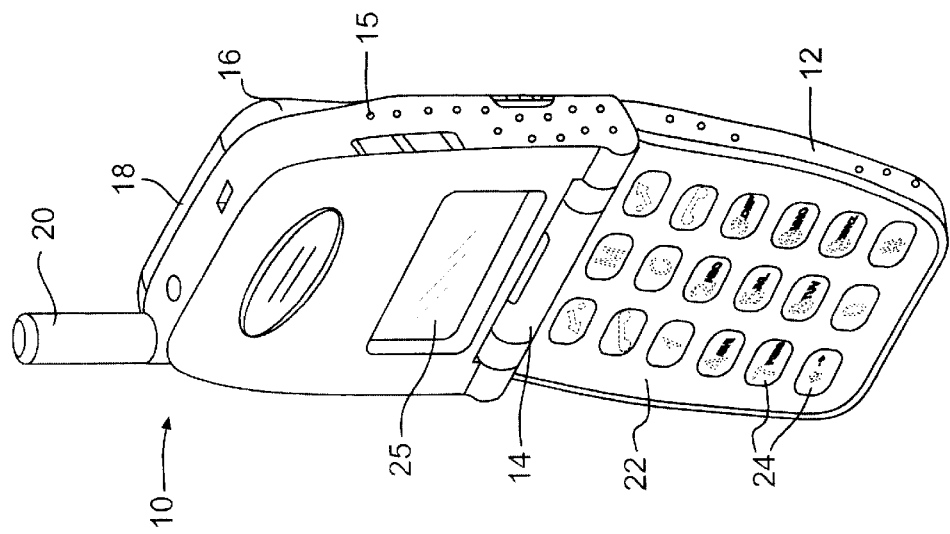
FIG. 12 is a front, top and right side perspective view of an open position.
Figure 11:
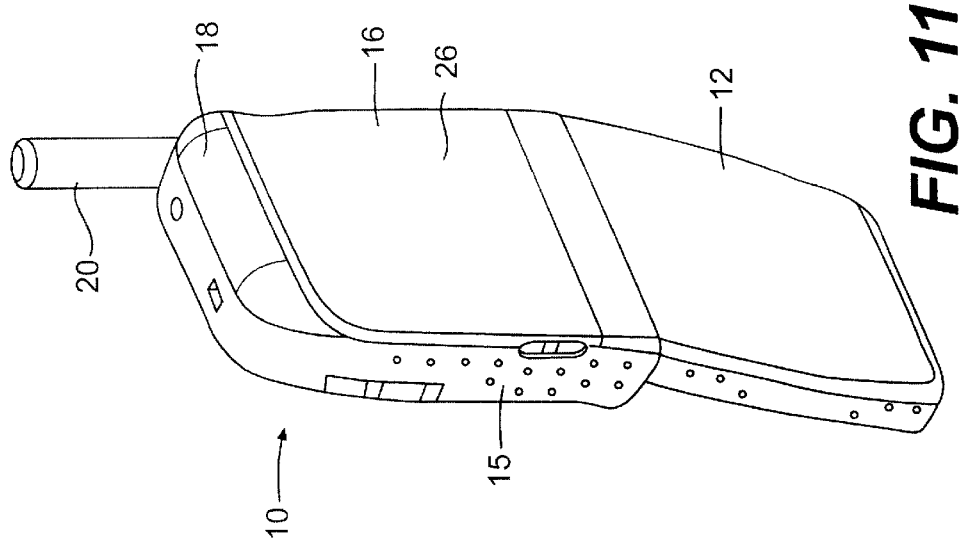
FIG. 11 is a back, top and right side perspective view of an open position.
Figure 14:
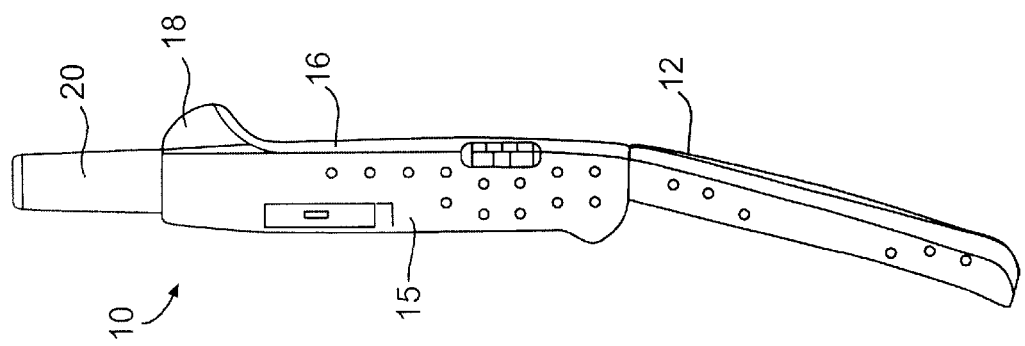
FIG. 14 is a right side view of an open position.
Figure 13:
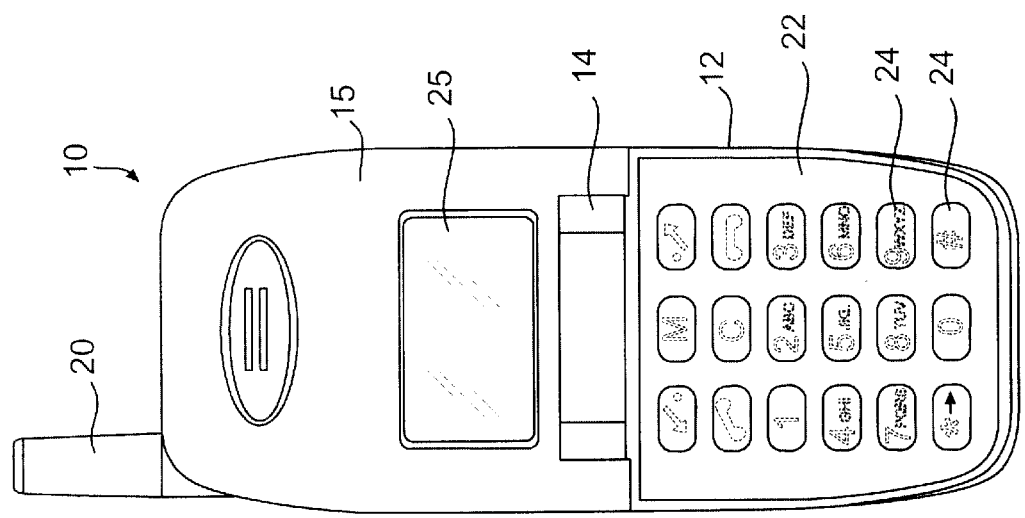
FIG. 13 is a front view of an open position.
Figure 16:
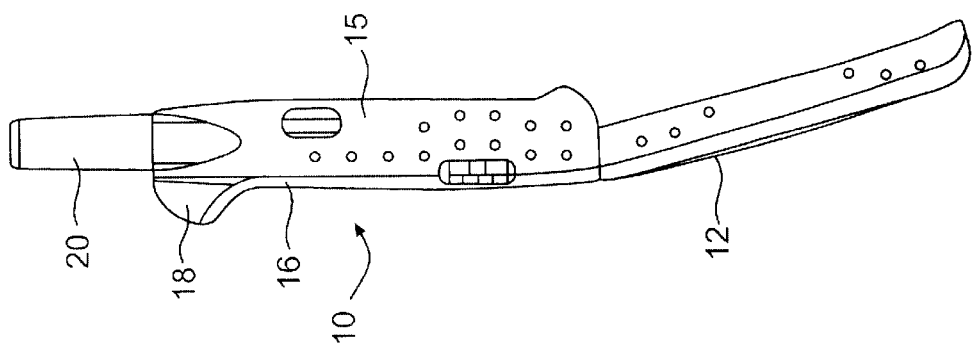
FIG. 16 is a left side view of an open position.
Figure 15:
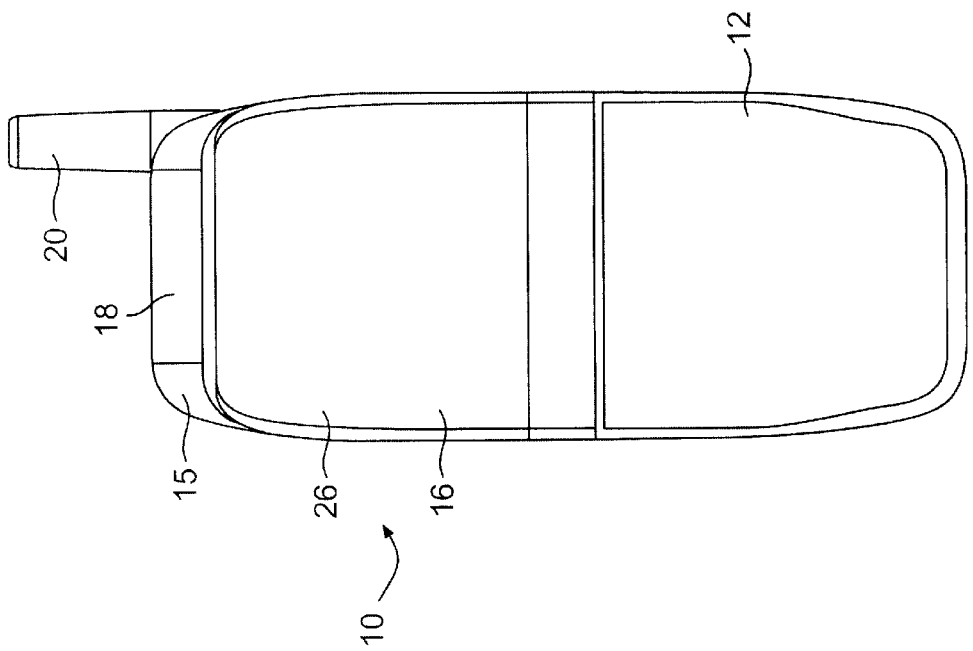
FIG. 15 is a back view of an open position.

As can be seen from FIGS. 9–16, the cover portion 12, in an open position, extends downward and forward from the main portion 15 and defines an angle with the main portion. The cover portion 12 includes a keypad side 22 having a number of keys 24 which are conventional in telephone handsets of the satellite or dual mode type for entering data, such as a telephone number to be called, and for controlling and selecting functions to be performed by the handset. For example, the keypad side 22 includes keys having the conventional alpha-numeric insignia of a conventional telephone keypad and keys having control functions, such as effecting a hang up or disconnect and switching between the satellite and cellular modes. The main portion 15 includes a display screen 25 for displaying information.

The cover portion 12 is movable between the closed position, in which the keypad side 22 contacts the main portion 15, and an open position, in which the keypad side 22 defines an angle of between 135° and 180° with the main portion 15. The cover portion 12 pivots down from the closed position to the open position, extending slightly forward from the bottom of the main portion 15. In FIGS. 1–16, the satellite antenna 16 is in a first position, in which the satellite antenna 16 is parallel to the main portion 15, contacting the back of the main portion.

Figure 18:
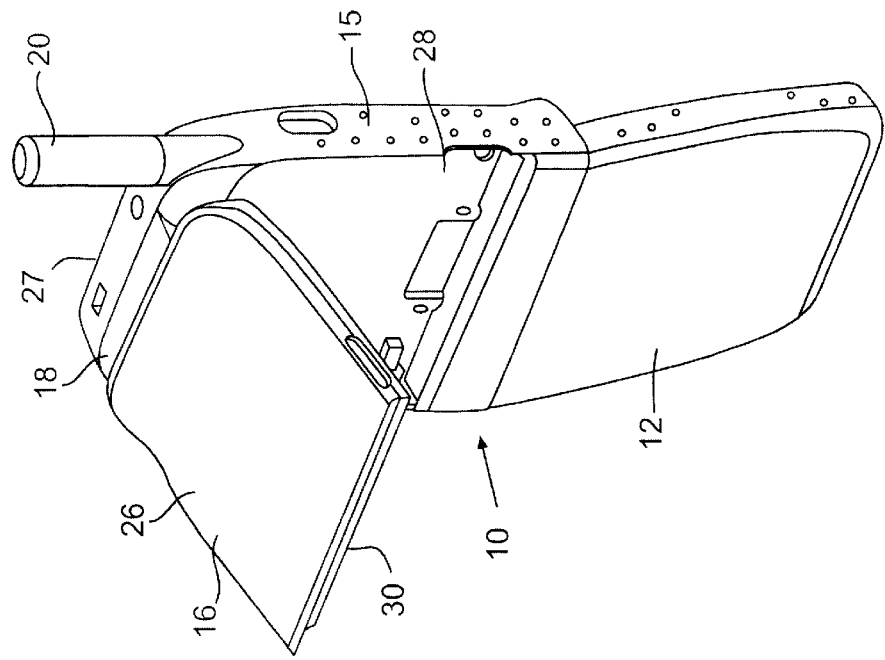
FIG. 18 is a back, top and left side perspective view of the handset with its satellite antenna extended.
Figure 17:
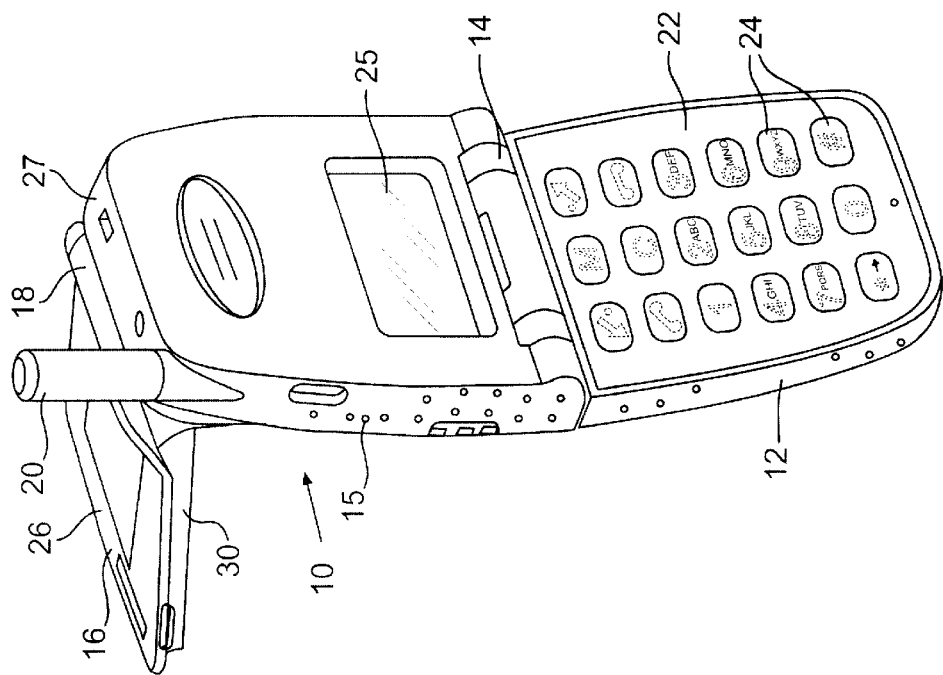
FIG. 17 is a front, top and left side perspective view of the satellite telephone handset with its satellite antenna extended.
Figure 20:
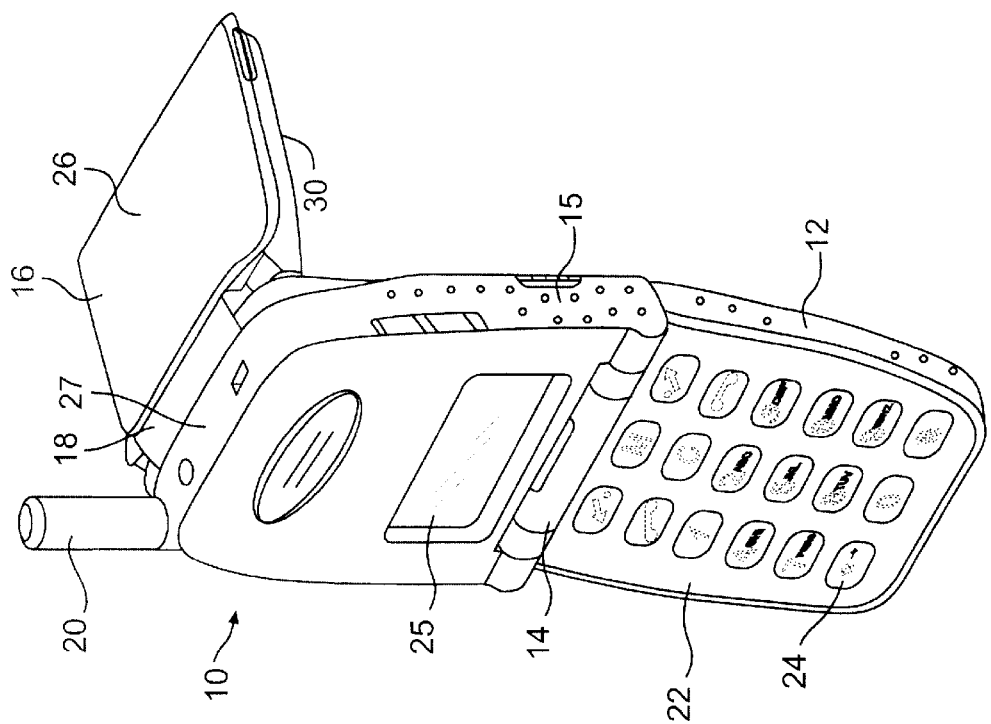
FIG. 20 is a front, top and right side perspective view of the handset with its satellite antenna extended.
Figure 19:
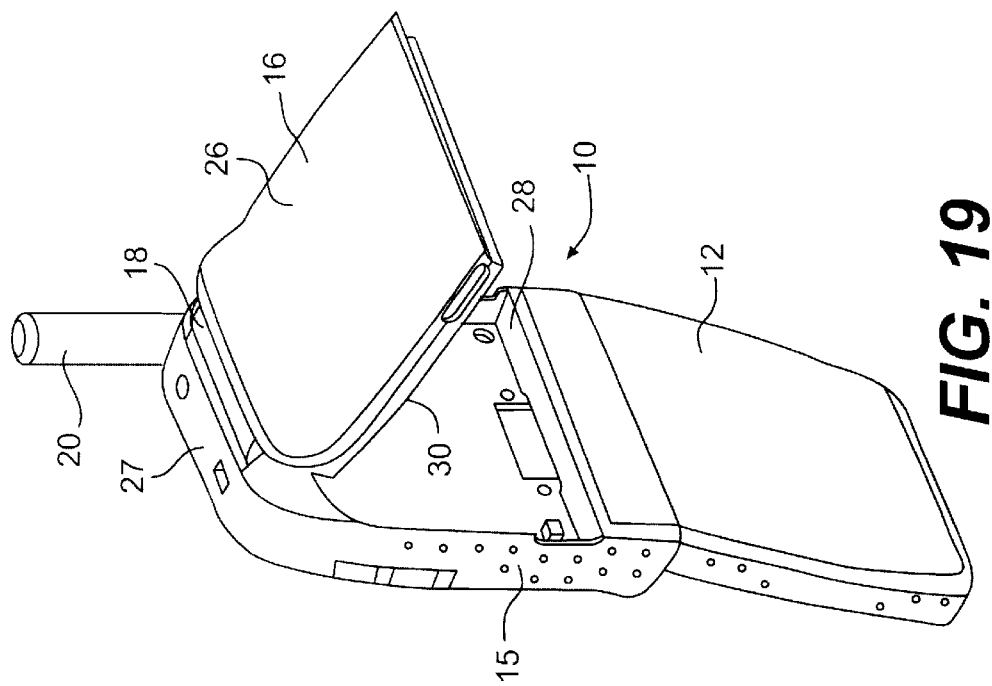
FIG. 19 is a back, top and right side perspective view of the handset with its satellite antenna extended.
Figure 22:
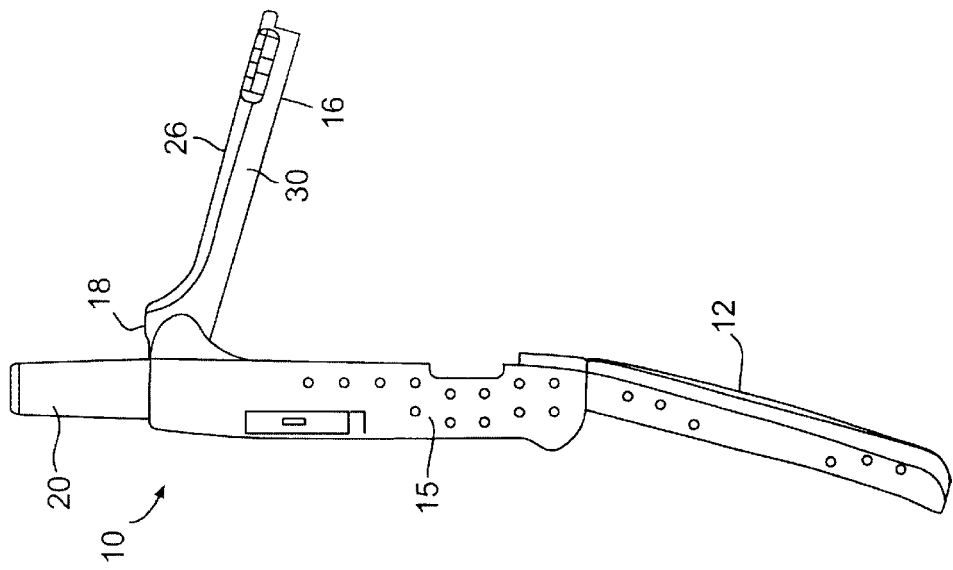
FIG. 22 is a right side view of the handset with its satellite antenna extended.
Figure 21:
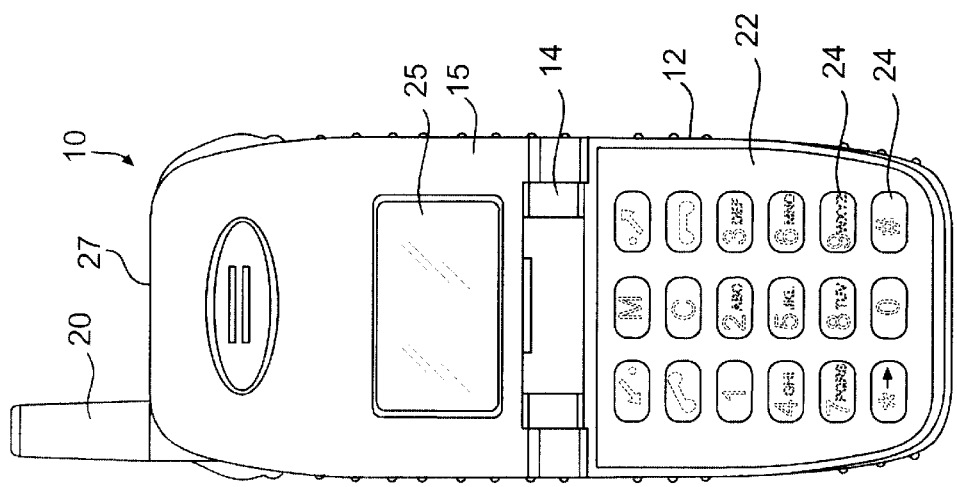
FIG. 21 is a front view of the handset with its satellite antenna extended.
Figure 24:
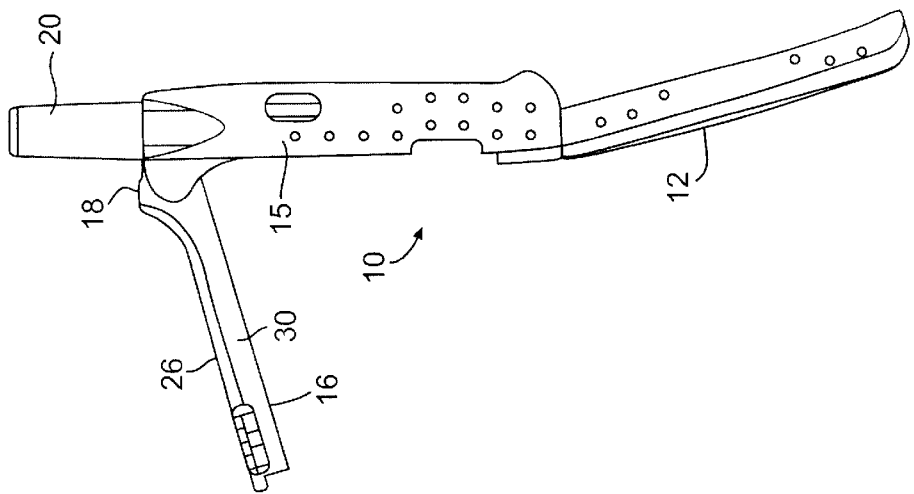
FIG. 24 is a left view of the handset with its satellite antenna extended.
Figure 23:
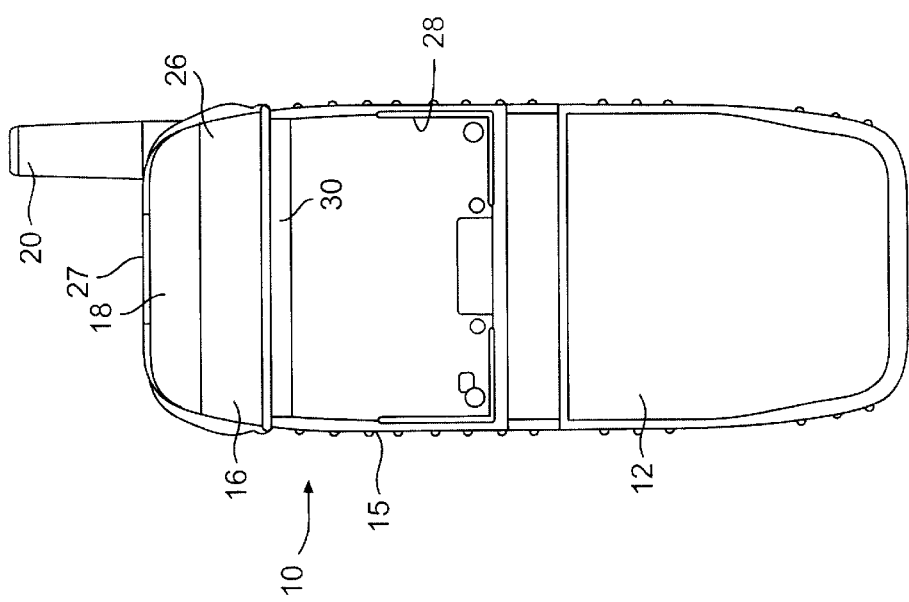
FIG. 23 is a back view of the handset with its satellite antenna extended.

As can be appreciated from FIGS. 17–20, the satellite antenna 16 is movable from its first position to a second position in which the satellite antenna 16 extends backward from the back of the handset 10 and generally perpendicular to the main portion 15. The satellite antenna 16 has a first side 26 which faces backward from the main portion 15 in the first position of the satellite antenna 16 and which faces in generally the same direction as a top surface 27 of the main portion 15 in the second position of the satellite antenna 16. The direction in which the first side 26 of the satellite antenna 16 faces differs from the direction in which the top surface 27 of the main portion 15 faces by less than 45°, for example, 15°. The satellite antenna 16 can be provided with an arrangement by which a regional distributor of the satellite telephones 10 can set the satellite antenna 16 to open to one of several possible second positions, the second position which provides the best communication with a satellite in the user's region. The possible second positions can include 15°, 45° and/or other angles between the direction in which the satellite antenna 16 faces and the direction in which the top surface 27 of the main portion 15 faces. Spring tension can be provided at the hinge connection 18, and a detent arrangement can be provided to hold the satellite antenna 16 in its first position and in the second position set by the regional distributor. A recess 28 is defined in the back of the main portion 15, and the satellite antenna 16 has a peripheral flange 30 which is received in the recess.

It will be apparent to those skilled in the art and it is contemplated that variations and/or changes in the embodiment illustrated and described herein may be made without departure from the present invention. Accordingly, it is intended that the foregoing description is illustrative only, not limiting, and that the true spirit and scope of the present invention will be determined by the appended claims.

What is claimed is:

1. A telephone handset comprising:
   a main portion including a recess;
   a satellite antenna mounted on said main portion, said satellite antenna being a flat antenna having sides and including a peripheral flange that is offset from at least one of the sides, the flange bing received in the recess; and
   a cover portion mounted on the main portion, the cover portion being movable between a closed position, in which the cover portion contacts the main portion, and an open position,
   wherein the cover portion has a keypad having keys.

2. The telephone handset of claim 1, wherein said satellite antenna is movable between a first position, in which said satellite antenna is parallel to said main portion, and a second position, in which said satellite antenna is generally perpendicular to said main portion.

3. The telephone handset of claim 2, wherein said satellite antenna has a first side and a second side opposite to said first side and, in said first position, said second side contacts said main portion.

4. The telephone handset of claim 2, wherein said satellite antenna has a first side and a second side opposite to said first side, said main portion has a top surface facing in a first direction, and, in said second position, said first side of said satellite antenna faces in generally the same direction as the top surface of the main portion.

5. The telephone handset of claim 4, wherein, in said second position, the direction in which said first side of said satellite antenna faces differs from the direction in which the top surface of the main portion faces, the difference being less 45°.

6. The telephone handset of claim 2, wherein, in the open position, the cover portion defines an angle with the main portion.

7. The telephone handset of claim 6, wherein the handset has a top and a bottom, the satellite antenna is connected to the main portion at one of said top and said bottom, and the cover portion is connected to the main portion at the other of said top and said bottom.

8. The telephone handset of claim 6, wherein the cover portion has a keypad side having the keypad; the cover portion has a cover side opposite to the keypad side; and, in the closed position, the keypad side contacts the main portion.

9. The telephone handset of claim 6, wherein the angle is between 135° and 180°.

10. The telephone handset of claim 6, wherein the handset has a front and a back; said cover portion, in its open position, extends forward from the handset; and said satellite antenna, in its second position, extends backward from said handset.

11. The telephone handset of claim 6, wherein the main portion has a first side and, in said closed position, the cover portion covers the main side of the main portion.

12. The telephone handset of claim 1, further comprising a cellular antenna.

13. The telephone handset of claim 1, wherein the flat antenna is a patch antenna.

14. The telephone handset according to claim 1, wherein in the closed position the cover substantially overlaps the satellite antenna along the main portion and wherein the satellite antenna is hinge mounted to the main portion.

* * * * *